US012001820B2

(12) United States Patent
Park et al.

(10) Patent No.: US 12,001,820 B2
(45) Date of Patent: Jun. 4, 2024

(54) ELECTRONIC APPARATUS CAPABLE OF APPLYING THE DESIGN OF A UI COMPONENT BASED ON THE DEVICE'S USAGE ENVIRONMENT AND THE OPERATING METHOD THEREOF

(71) Applicant: TOBESOFT CO., LTD., Seoul (KR)

(72) Inventors: JeongBeom Park, Seoul (KR); Songi Park, Seoul (KR); Woo cheol Lee, Seoul (KR); Jea Il Kim, Namyangju-si (KR)

(73) Assignee: TOBESOFT CO., LTD., Seoul (KR)

( * ) Notice: Subject to any disclaimer, the term of this patent is extended or adjusted under 35 U.S.C. 154(b) by 0 days.

(21) Appl. No.: 18/236,402

(22) Filed: Aug. 22, 2023

(65) Prior Publication Data

US 2024/0118874 A1 Apr. 11, 2024

(30) Foreign Application Priority Data

Oct. 6, 2022 (KR) .......................... 10-2022-0127944

(51) Int. Cl.
*H04M 1/72448* (2021.01)
*G06F 8/36* (2018.01)
*G06F 8/38* (2018.01)

(52) U.S. Cl.
CPC . *G06F 8/38* (2013.01); *G06F 8/36* (2013.01)

(58) Field of Classification Search
CPC ...................... G06F 3/048–05; H04M 1/72448
See application file for complete search history.

(56) References Cited

U.S. PATENT DOCUMENTS

| | | | | |
|---|---|---|---|---|
| 8,831,567 B2* | 9/2014 | Kim | ................... | H04M 1/72448 455/418 |
| 9,946,427 B1* | 4/2018 | Murphy | ................... | G06F 9/451 |
| 11,287,959 B2* | 3/2022 | Zhang | ...................... | H04L 67/75 |
| 2005/0076306 A1* | 4/2005 | Martin | ..................... | G06F 9/451 715/788 |
| 2005/0197138 A1* | 9/2005 | Kaminsky | ......... | H04M 1/72457 455/456.1 |
| 2009/0163182 A1* | 6/2009 | Gatti | ................. | H04M 1/72451 455/414.1 |
| 2011/0055757 A1* | 3/2011 | Kurozumi | ............... | G06F 9/451 715/810 |
| 2012/0015624 A1* | 1/2012 | Scott | ....................... | G06F 9/451 715/811 |
| 2014/0365965 A1* | 12/2014 | Bray | ..................... | G06F 3/0482 345/589 |
| 2015/0149939 A1* | 5/2015 | Mayblum | ......... | H04M 1/72427 715/765 |
| 2024/0104877 A1* | 3/2024 | Henderson | .............. | G06T 15/04 |

* cited by examiner

Primary Examiner — Daniel Rodriguez
(74) *Attorney, Agent, or Firm* — Park, Kim & Suh, LLC

(57) ABSTRACT

Disclosed are an electronic apparatus capable of applying the design of a UI component based on the device's usage environment and the operating method thereof. The present invention presents an electronic apparatus capable of dynamically changing and applying the design of a UI component configuring an application according to a usage environment of an electronic apparatus which drives the application and the operating method thereof to provide an appropriate UI design according to the device's usage environment of a user to the user.

11 Claims, 2 Drawing Sheets

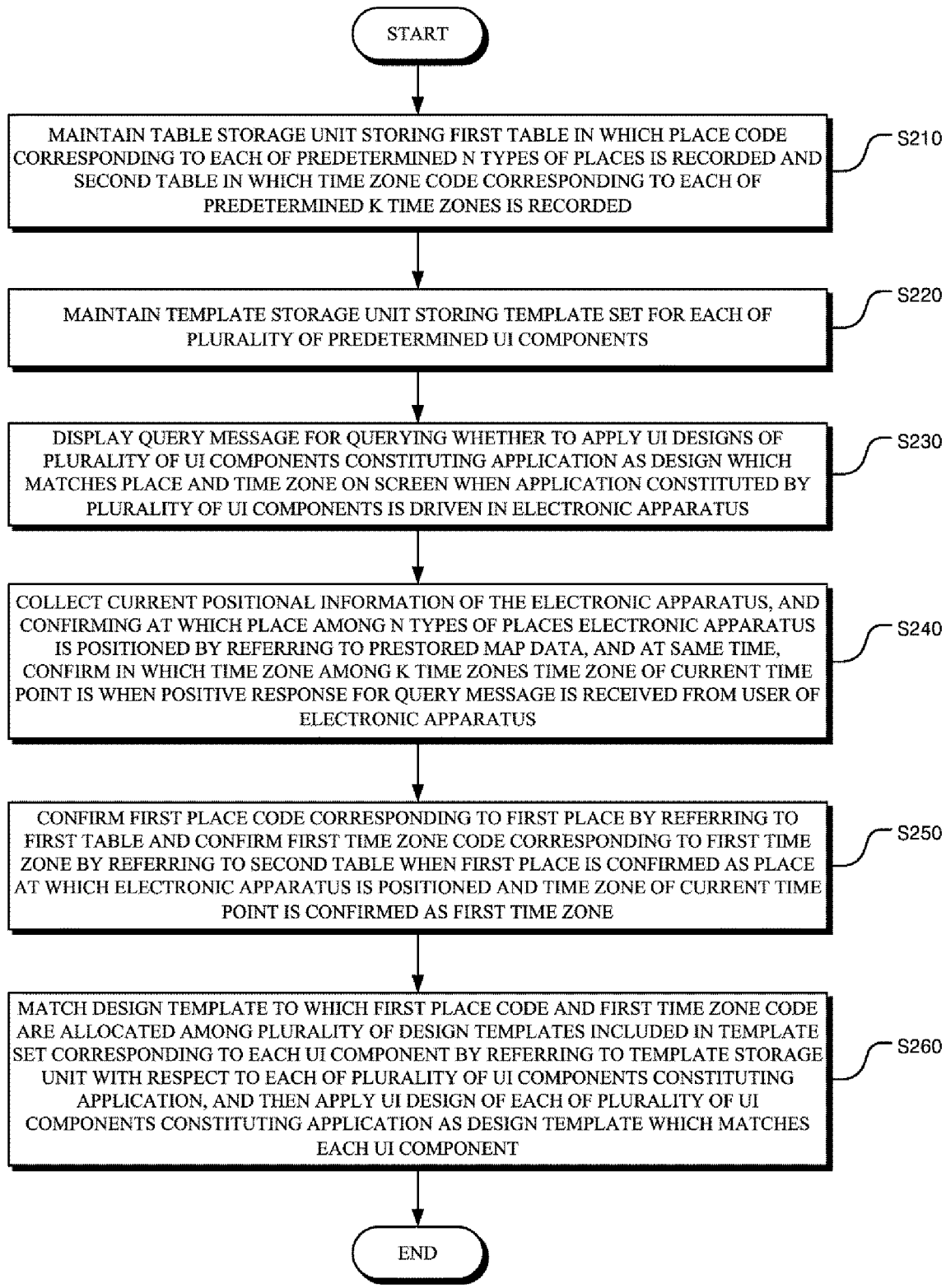

ELECTRONIC APPARATUS CAPABLE OF APPLYING THE DESIGN OF A UI COMPONENT BASED ON THE DEVICE'S USAGE ENVIRONMENT AND THE OPERATING METHOD THEREOF

CROSS-REFERENCE TO RELATED APPLICATIONS

This application claims priority to and the benefit of Korean Patent Application No. 10-2022-0127944 filed in the Korean Intellectual Property Office on Oct. 6, 2022, the entire contents of which are incorporated herein by reference.

TECHNICAL FIELD

The present invention relates to an electronic apparatus capable of applying the design of a UI component based on the device's usage environment and the operating method thereof.

BACKGROUND ART

In general, users who develop a user interface (UI) often generate various UI components such as a button, a text input box, a menu window, etc., in order to implement various functions when developing the UI by using a UI development tool.

In this regard, a user who intends to develop a predetermined UI needs to perform a design task for UI components constituting the UI by considering an industrial classification to which the UI is to be applied, or a platform related to a job of a user who is to use the UI or a target product to which the UI is applied.

The design of this UI is one of the most important things because the design of the UI plays a lot of roles in promoting the usage convenience of users using the applications with the corresponding UI.

However, ordinary applications are often composed of UI components consisting of one type of UI design designated by developers, so there is a problem of not providing an appropriate UI design according to the user's device usage environment using the application.

For example, if the user uses an application while walking on a sidewalk, the user must use the application while moving, so that it may be appropriate that the size of UI components such as buttons or text input boxes is larger than that in general situations, or a color of the UI component has a higher readability than that in general situations. In addition, if the user uses the application in the building, the user can use the application in an environment in which the user can concentrate, the design of the UI component can be configured accordingly, and if the user uses the application at night, it may be appropriate that the color of the UI component is configured with a color with less glaring.

Therefore, the design of the UI component is not limited to one type, but according to the usage environment of the device that drives the application, a research on a technology that supports the design of the UI component that constitutes the application capable of dynamically changing and applying is required.

SUMMARY OF THE INVENTION

The present invention presents an electronic apparatus capable of dynamically changing and applying the design of a UI component configuring an application according to a usage environment of an electronic apparatus which drives the application and the operating method thereof to provide an appropriate UI design according to the device's usage environment of a user to the user.

An exemplary embodiment of the present invention provides an electronic apparatus capable of applying the design of a UI component based on the device's usage environment, which includes: a table storage unit storing a first table in which a place code corresponding to each of predetermined n (n is a natural number of 2 or more) types of places is recorded and a second table in which a time zone code corresponding to each of predetermined k (k is a natural number of 2 or more) time zones is recorded; a template storage unit storing a template set for each of a plurality of predetermined UI components, in which the template set for each of the plurality of UI components means a set constituted by a plurality of design templates pre-made for expressing each UI component, and a place code and a time zone code pre-specified to match each design template from the n types of places and the k time zones, respectively are allocated to the plurality of design templates included in the template set for each of the plurality of UI components; a query unit displaying, when an application constituted by the plurality of UI components is driven in the electronic apparatus, a query message for querying whether to apply UI designs of the plurality of UI components constituting the application as a design which matches the place and the time zone on a screen; a confirmation unit collecting, when a positive response for the query message is received from the user of the electronic apparatus, current positional information of the electronic apparatus, and confirming at which place among the n types of places the electronic apparatus is positioned by referring to prestored map data, and at the same time, confirming in which time zone among the k time zones a time zone of a current time point is; a code confirming unit confirming, when a first place is confirmed as a place at which the electronic apparatus is positioned and the time zone of the current time point is confirmed as a first time zone, a first place code corresponding to the first place by referring to the first table and confirming a first time zone code corresponding to the first time zone by referring to the second table; and a UI configuration unit matching a design template to which the first place code and the first time zone code are allocated among a plurality of design templates included in the template set corresponding to each UI component by referring to the template storage unit with respect to each of the plurality of UI components constituting the application, and then applying the UI design of each of the plurality of UI components constituting the application as the design template which matches each UI component.

Another exemplary embodiment of the present invention provides an operating method of an electronic apparatus capable of applying the design of a UI component based on the device's usage environment, which includes: maintaining a table storage unit storing a first table in which a place code corresponding to each of predetermined n (n is a natural number of 2 or more) types of places is recorded and a second stable in which a time zone code corresponding to each of predetermined k (k is a natural number of 2 or more) time zones is recorded; maintaining a template storage unit storing a template set for each of a plurality of predetermined UI components, in which the template set for each of the plurality of UI components means a set constituted by a plurality of design templates pre-made for expressing each UI component, and a place code and a time zone code pre-specified to match each design template from the n types of places and the k time zones, respectively are allocated to the plurality of design templates included in the template set for each of the plurality of UI components; displaying, when an application constituted by the plurality of UI components is driven in the electronic apparatus, a query message for querying whether to apply UI designs of the plurality of UI components constituting the application as a design which matches the place and the time zone on a screen; collecting, when a positive response for the query message is received from the user of the electronic apparatus, current positional information of the electronic apparatus, and confirming at which place among the n types of places the electronic apparatus is positioned by referring to prestored map data, and at the same time, confirming in which time zone among the k time zones a time zone of a current time point is; confirming, when a first place is confirmed as a place at which the electronic apparatus is positioned and the time zone of the current time point is confirmed as a first time zone, a first place code corresponding to the first place by referring to the first table and confirming a first time zone code corresponding to the first time zone by referring to the second table; and matching a design template to which the first place code and the first time zone code are allocated among a plurality of design templates included in the template set corresponding to each UI component by referring to the template storage unit with respect to each of the plurality of UI components constituting the application, and then applying the UI design of each of the plurality of UI components constituting the application as the design template which matches each UI component.

According to the present invention, an electronic apparatus which is capable of dynamically changing and applying the design of a UI component configuring an application according to a usage environment of an electronic apparatus which drives the application and the operating method thereof are presented to provide an appropriate UI design according to the device's usage environment of a user to the user.

BRIEF DESCRIPTION OF THE DRAWINGS

FIG. 2 is a flowchart illustrating an operating method of an electronic apparatus capable of applying a design of a UI component based on the device's usage environment according to an exemplary embodiment of the present invention.

DETAILED DESCRIPTION

Figure 1:
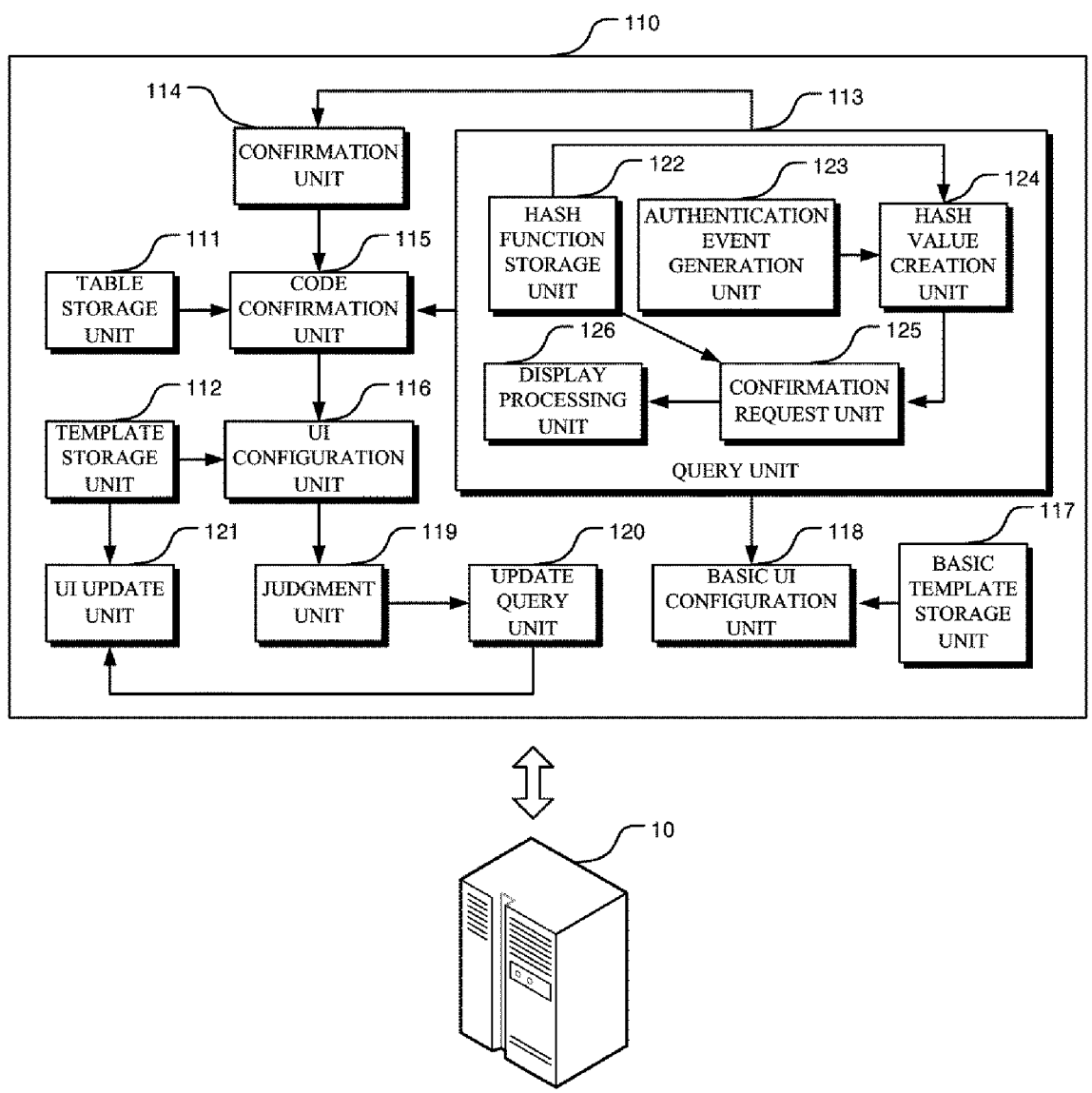
FIG. 1 is a diagram illustrating a structure of an electronic apparatus capable of applying a design of a UI component based on the device's usage environment according to an exemplary embodiment of the present invention.

Hereinafter, exemplary embodiments of the present invention will be described in detail with reference to the accompanying drawings. The description does not limit the present invention to specific exemplary embodiments, and it should be understood that the present invention covers all the modifications, equivalents and replacements included within the idea and technical scope of the present invention. In describing each drawing, like reference numerals refer to like elements and if not contrarily defined, all terms used herein including technological or scientific terms have the same meanings as those generally understood by a person with ordinary skill in the art.

In this document, unless explicitly described to the contrary, the word "comprise" and variations such as "comprises" or "comprising", will be understood to imply the inclusion of stated elements but not the exclusion of any other elements. Further, in various exemplary embodiments of the present invention, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning compute program instructions mounted on a processor or a memory of data processible equipment such as a universal computer, a special computer, a portable notebook computer, a network computer, etc., and performing designated functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

FIG. 1 is a diagram illustrating a structure of an electronic apparatus capable of applying a design of a UI component based on the device's usage environment according to an exemplary embodiment of the present invention.

Referring to FIG. 1, the electronic apparatus 110 according to the present invention includes a table storage unit 111, a template storage unit 112, a query unit 113, a confirmation unit 114, a code confirmation unit 115, and a UI configuration unit 116.

The table storage unit 111 stores a first table in which a place code corresponding to each of predetermined n (n is a natural number of 2 or more) types of places is recorded and a second table in which a time zone code corresponding to each of predetermined k (k is a natural number of 2 or more) time zones is recorded.

For example, the table storage unit 111 may store a first table shown in Table 1 below and a second table shown in Table 2 below.

TABLE 1

| n types of places | Industrial classification codes |
| --- | --- |
| Road | Place code 1 |
| Sidewalk | Place code 2 |
| Building | Place code 3 |
| Mountain | Place code 4 |
| . . . | . . . |

TABLE 2

| k time zones | Job codes |
| --- | --- |
| 0 to 6 o'clock | Time zone code 1 |
| 6 to 8 o'clock | Time zone code 2 |
| 8 to 10 o'clock | Time zone code 3 |
| 10 to 12 o'clock | Time zone code 4 |
| ... | ... |

The template storage unit 112 stores a template set for each of a plurality of predetermined UI components.

Here, the plurality of UI components mean components which constitute the UI of the application, such as a button, a text input box, a menu window, etc.

The template set for each of the plurality of UI components means a set constituted by a plurality of design templates pre-made for expressing each UI component.

For example, when there is the UI component called 'button', the template set for 'button' may mean a set constituted by a plurality of design templates pre-made for expressing the UI component called 'button' on the UI. For example, the template set for 'button' may be constituted by design templates such as 'round-shaped template', 'square-shaped template', 'rhombus-shaped template, etc.

In this case, a place code and a time zone code pre-specified to match respective design templates may be allocated to a plurality of design templates included in template sets for the plurality of respective UI components from the n types of places and the k time zones, respectively.

For example, when the design template called 'round-shaped template' is present in the template set for the UI component called 'button', 'place code 1' corresponding to 'road' pre-specified to match 'round-shaped template' among n types of places shown in Table 1 above may be allocated and 'time zone code 3' corresponding to '8 to 10 o'clock' pre-specified to match 'round-shaped template' among k time zones shown in Table 2 above may be allocated to the 'round-shaped template'.

As such, when the application constituted by the plurality of UI components is driven in the electronic apparatus 110 in a situation in which the table storage unit 111 stores the first and second tables, and the template storage unit 112 stores the template sets for the plurality of respective UI components, the query unit 113 displays, on a screen, a query message for querying whether UI designs of the plurality of UI components constituting the application are to be applied as designs which match the place and the time zone.

As such, when the query message is displayed on the screen, the user of the electronic apparatus 110 may apply, to the electronic apparatus 110, a response representing whether the UI design of the application is to be applied as the design which matches the place and the time zone. In this regard, the user intends to configure the UI design of the application as the design according to the place and the time zone at which the user is currently positioned, the user may apply, to the electronic apparatus 110, a positive response for the query message, and when the user intends to configure the UI design of the application as a basic UI design which is not related to the place and the time zone, the user may apply, to the electronic apparatus 110, a negative response for the query message.

In this regard, according to an exemplary embodiment of the present invention, the electronic apparatus 110 may further include a basic template storage unit 117 and a basic UI configuration unit 118 as components for applying the UI design of the application as a basic UI design when receiving the negative response from the user.

The basic template storage unit 117 stores a predetermined basic design template for each of the plurality of UI components.

The basic design template is a template for basically configuring the design for the UI component regardless of the place and the time zone, and one basic design template may be present for each UI component.

In this case, when the basic UI configuration unit 118 receives the negative response for the query message from the user of the electronic apparatus 110, the basic UI configuration unit 118 may apply the UI designs of the plurality of respective UI components constituting the application as the basic design template for each UI component by referring to the basic template storage unit 117.

On the contrary, when the positive response for the query message is received from the user of the electronic apparatus 110, the confirmation unit 114 collects current positional information of the electronic apparatus 110, and confirms at which place among the n types of places the electronic apparatus 110 is positioned by referring to prestored map data, and at the same time, confirms in which time zone among the k time zones a time zone of a current time point is.

When a first place is confirmed as a place at which the electronic apparatus 110 is positioned and the time zone of the current time point is confirmed as a first time zone, the code confirmation unit 115 confirms a first place code corresponding to the first place by referring to the first table and confirms a first time zone code corresponding to the first time zone by referring to the second table.

For example, when it is assumed that the first table and the second table are configured as in Tables 1 and 2 above, and it is confirmed that the first place is 'road' and the first time zone is '8 to 10 o'clock', the code confirmation unit 115 may confirm 'place code 1' as the first place code and confirm 'time zone code 3' as the first time zone code.

The UI configuration unit 116 matches a design template to which the first place code and the first time zone code are allocated among a plurality of design templates included in the template set corresponding to each UI component by referring to the template storage unit 112 with respect to each of the plurality of UI components constituting the application, and then applies the UI design of each of the plurality of UI components constituting the application as the design template which matches each UI component.

For example, when the UI component called 'button' is present among the plurality of UI components constituting the application, the template set for 'button' is as 'round-shaped template', 'square-shaped template', and 'rhombus-shaped template, and the first place code is 'place code 1', and the first time zone code is 'time zone code 3', the UI configuration unit 116 may match the design template to which 'place code 1' and 'time zone code 3' are allocated among 'round-shaped template', 'square-shaped template', and 'rhombus-shaped template' included in the template set corresponding to the UI component called 'button' with the UI component called 'button' by referring to the template storage unit 112. By such a scheme, the UI configuration unit 116 may match the design template to which 'place code 1' and 'time zone code 3' are allocated with each of the plurality of UI components constituting the application.

Then, the UI configuration unit 116 may apply the UI design of each of the plurality of UI components constituting the application to the design template which matches each UI component. In this regard, when the design template which matches the UI component called 'button' among the plurality of UI components constituting the application is 'round-shaped template', the UI configuration unit 116 may apply the UI design of the UI component called 'button' as 'round-shaped template'.

According to an exemplary embodiment of the present invention, the electronic apparatus 110 may further include a judgment unit 119, an update query unit 120, and a UI update unit 121.

The judgment unit 119 confirms positional information of the electronic apparatus 110 and the time zone of the current time point at a predetermined confirmation cycle interval when the UI design of each of the plurality of UI components constituting the application has been applied as the design template which matches each UI component through the UI configuration unit 116 to judge whether a fluctuation for the first place and a fluctuation for the first time zone occur.

For example, when the confirmation cycle is '5 minutes', the judgment unit 119 confirms the positional information of the electronic apparatus 110 and the time zone of the current time point at an interval of '5 minutes' to judge whether the fluctuation for the first place and the fluctuation for the first time zone occur.

When it is judged that the fluctuation for the first place occurs as the user is positioned on the 'road', and then moves to the 'sidewalk' and the fluctuation for the first time zone occurs due to the flow of the time, the update query unit 120 displays, on the screen, an update query message for querying whether to update the UI designs of the plurality of UI components constituting the application with a design which matches the fluctuating place or time zone.

In this case, the user of the electronic apparatus 110 sees the update query message to determine whether to fluctuate a UI design applied in a current situation again according to the fluctuating place or time zone, and then apply a response thereto onto the electronic apparatus 110.

When an UI update instruction is received from the user of the electronic apparatus 110 in response to the update query message, the UI update unit 121 confirms the place code for the fluctuating place or the time zone code for the fluctuating time zone by referring to the first table and the second table, matches the design template to which allocated the place code for the fluctuating place or the time zone code for the fluctuating time zone among the plurality of design templates included in the template set corresponding to each UI component by referring to the template storage unit 112 with respect to each of the plurality of UI components constituting the application, and then applies the UI design of each of the plurality of UI components constituting the application as the design template which matches each UI component again.

According to an exemplary embodiment of the present invention, the electronic apparatus 110 may further include a component for allowing only a pre-specified registered user to use the UI design application service matching the place and the time zone according to the present invention.

In this regard, in the present invention, there may be a user authentication server 10 including a user database storing authentication information of a plurality of users who is pre-specified as a registered user who may use the UI design application service matching the place and the time zone.

In this case, the user authentication server 10 may store, in the user database, an authentication code previously issued for each user and a public key corresponding to a private key previously issued for each user as the authentication information for the plurality of users.

In this regard, the user authentication server 10 may include a user database shown in Table 3 below.

TABLE 3

| Plurality of registered users | Authentication code | Public keys |
|---|---|---|
| User 1 | Authentication code 1 | Public key 1 |
| User 2 | Authentication code 2 | Public key 2 |
| User 3 | Authentication code 3 | Public key 3 |
| User 4 | Authentication code 4 | Public key 4 |
| . . . | . . . | . . . |

In this case, the query unit 113 confirms whether the user of the electronic apparatus 110 is the registered user who may use the UI design application service which matches the place and the time zone by interlocking with the user authentication server 10 when the application is driven in the electronic apparatus 110, and then when it is confirmed that the user of the electronic apparatus 110 is the registered user who may use the UI design application service which matches the place and the time zone, the query unit 113 may display the query message on the screen.

In this case, according to an exemplary embodiment of the present invention, the query unit 113 may include a hash function storage unit 122, an authentication event generation unit 123, a hash value creation unit 124, a confirmation request unit 125, and a display processing unit 126 as specific components for performing authentication for the user of the electronic apparatus 110 by interlocking with the user authentication server 10.

The hash function storage unit 122 stores a first authentication code for the user of the electronic apparatus 110, and p (p is a natural number) different hash functions (the p hash functions are also stored in the user authentication server 10, and different unique numbers constituted by natural numbers of p or less are allocated to the p hash functions, respectively), which are previously shared with the user authentication server 10.

For example, when p is '6', the hash function storage unit 122 may store '6' different hash functions shown in Table 4 below.

TABLE 4

| Hash functions | Unique numbers |
|---|---|
| Hash function 1 | 1 |
| Hash function 2 | 2 |
| Hash function 3 | 3 |
| Hash function 4 | 4 |
| Hash function 5 | 5 |
| Hash function 6 | 6 |

The authentication event generation unit 123 generates an authentication event for confirming whether the user of the electronic apparatus 110 is the registered user who may use the UI design application service which matches the place and the time zone when the application is driven in the electronic apparatus 110.

The hash value creation unit 124 randomly selects, when the authentication event is generated, a first hash function which is any one of the p hash functions, and then applies the first authentication code into the first hash function as an input to create a first hash value.

In this regard, when the user of the electronic apparatus 110 is 'user 2' and an authentication code previously issued for 'user 2' is 'authentication code 2', the hash value creation unit 124 randomly selects the first hash function which is any one of the hash functions shown in Table 4 above as in 'hash function 3', and then applies 'authentication code 2' to 'hash function 3' as the input to create a first hash value.

The confirmation request unit 125 confirms a first unique number allocated to the first hash function, creates a first electronic signature value by electronically signing the first unique number with a first private key previously issued for the user of the electronic apparatus 110, and then transmits a confirmation request instruction for requesting confirmation of whether the user of the electronic apparatus 110 is the registered user who may use the UI design application service which matches the place and the time zone while transmitting the first electronic signature value and the first hash value to the user authentication server 10.

In this regard, as in the example, when the user is assumed as 'user 2' and the first hash function is assumed as 'hash function 3', the confirmation request unit 125 may create the first electronic signature value by electronically signing '3' which is a unique number allocated to 'hash function 3' with 'private key 2' (here, 'private key 2' is a private key corresponding to 'public key 2' which is a public key for 'user 2') which is first private key previously issued for 'user 2'. Then, the confirmation request unit 125 may transmit the confirmation request instruction for requesting confirmation whether 'user 2' is the registered user who may use the UI design application service which matches the place and the time zone while transmitting the first electronic signature value and the first hash value to the user authentication server 10.

As such, when the confirmation request instruction for requesting confirmation whether the user is the registered user who may use the UI design application service which matches the place and the time zone is transmitted while transmitting the first electronic signature value and the first hash value to the user authentication server 10 from the electronic apparatus 110, the user authentication server 10 may perform a confirmation process for whether the user is the registered user who may use the UI design application service which matches the place and the time zone.

Specifically, the user authentication server 10 may extract the first authentication code and the first public key for the user, which are stored in the user database, decrypt the first electronic signature value with the first public key to restore the first unique number, and then compare the hash value created by applying the first authentication code into the first hash function to which the first unique number is allocated among the p hash functions as the input with the first hash value, and when it is confirmed that both hash values coincide with each other, confirm that the user is the registered user who may use the UI design application service which matches the place and the time zone.

In this regard, as in the example, it is assumed that the user is 'user 2', and the user authentication server 10 receives the first electronic signature value and the first hash value from the electronic apparatus 110.

Then, the user authentication server 10 extracts 'authentication code 2' and 'public key 2' stored for 'user 2' from the user database shown in Table 3 above, and decrypts the first electronic signature value with 'public key 2' to restore the unique number '3'.

Thereafter, the user authentication server 10 may extract 'hash function 3' to which the unique number '3' is allocated from the hash functions shown in Table 4 above, create the hash value by applying 'authentication code 2' into 'hash function 3' as the input, and then compare the hash value with the first hash value received from the electronic apparatus 110, and when it is confirmed that both hash values coincide with each other, confirm that 'user 2' is the registered user who may use the UI design application service which matches the place and the time zone, and when it is confirmed that 'user 2' is the registered user, transmit, to the electronic apparatus 110, a response indicating that it is confirmed that 'user 2' is the registered user.

As such, when the electronic apparatus 110 receives the response indicating that confirmed the user of the electronic apparatus 110 is the registered user who may use the UI design application service which matches the place and the time zone from the user authentication server 10, the display processing unit 126 may allow the user to display, on the screen, the query message for querying whether to apply the UI designs of the plurality of UI components constituting the application with the design which matches the place and the time zone.

FIG. 2 is a flowchart illustrating an operating method of an electronic apparatus capable of applying a design of a UI component based on the device's usage environment according to an exemplary embodiment of the present invention.

In step S210, a table storage unit is maintained, which stores a first table in which a place code corresponding to each of predetermined n (n is a natural number of 2 or more) types of places is recorded and a second table in which a time zone code corresponding to each of predetermined k (k is a natural number of 2 or more) time zones is recorded.

In step S220, a template storage unit is maintained, which stores a template set for each of a plurality of predetermined UI components, in which the template set for each of the plurality of UI components means a set constituted by a plurality of design templates pre-made for expressing each UI component, and a pre-specified place code and a time zone code pre-specified to match each design template from the n types of places and the k time zones, respectively are allocated to the plurality of design templates included in the template set for each of the plurality of UI components.

In step S230, when an application constituted by the plurality of UI components is driven in the electronic apparatus, a query message for querying whether to apply UI designs of the plurality of UI components constituting the application as a design which matches the place and the time zone is displayed on a screen.

In step S240, when a positive response for the query message is received from the user of the electronic apparatus, current positional information of the electronic apparatus is collected, and at which place among the n types of places the electronic apparatus is positioned is confirmed by referring to prestored map data, and at the same time, it is confirmed in which time zone among the k time zones a time zone of a current time point is.

In step S250, when a first place is confirmed as a place at which the electronic apparatus is positioned and the time zone of the current time point is confirmed as a first time zone, a first place code corresponding to the first place is confirmed by referring to the first table and a first time zone code corresponding to the first time zone is confirmed by referring to the second table.

In step S260, a design template to which the first place code and the first time zone code are allocated among a plurality of design templates included in the template set corresponding to each UI component is matched by referring to the template storage unit with respect to each of the plurality of UI components constituting the application, and then the UI design of each of the plurality of UI components constituting the application is applied as the design template which matches each UI component.

In this case, according to an exemplary embodiment of the present invention, the operating method of an electronic apparatus may further include: maintaining a basic template storage unit storing a predetermined basic design template for each of the plurality of UI components; and applying, when receiving the negative response for the query message from the user of the electronic apparatus, the UI designs of the plurality of respective UI components constituting the application as the basic design template for each UI component by referring to the basic template storage unit.

According to an exemplary embodiment of the present invention, the operating method of an electronic apparatus may further include: confirming positional information of the electronic apparatus and the time zone of the current time point at a predetermined confirmation cycle interval when the UI design of each of the plurality of UI components constituting the application has been applied as the design template which matches each UI component to judge whether a fluctuation for the first place and a fluctuation for the first time zone occur; displaying, when it is judged that the fluctuation for the first place occurs and the fluctuation for the first time zone occurs, on the screen, an update query message for querying whether to update the UI designs of the plurality of UI components constituting the application with a design which matches the fluctuating place or time zone; and confirming, when an UI update instruction is received from the user of the electronic apparatus in response to the update query message, the place code for the fluctuating place or the time zone code for the fluctuating time zone by referring to the first table and the second table, matching the design template to which the place code for the fluctuating place or the time zone code for the fluctuating time zone are allocated among the plurality of design templates included in the template set corresponding to each UI component by referring to the template storage unit with respect to each of the plurality of UI components constituting the application, and then applying the UI design of each of the plurality of UI components constituting the application as the design template which matches each UI component again.

According to an exemplary embodiment of the present invention, in step S230, it may be confirmed whether the user of the electronic apparatus is a registered user who may use a UI design application service which matches the place and the time zone, and then the query message may be displayed on the screen when it is confirmed that the user of the electronic apparatus is the registered user who may use the UI design application service which matches the place and the time zone by interlocking with a predetermined user authentication server, in which the user authentication server includes a user database storing authentication information of a plurality of users, which is pre-specified that the user is the registered user who may use the UI design application service which matches the place and the time zone when the application is driven in the electronic apparatus.

In this case, according to an exemplary embodiment of the present invention, step S230 may include maintaining a hash function storage unit storing a first authentication code for the user of the electronic apparatus, and p (p is a natural number) different hash functions, in which the p hash functions are also stored in the user authentication server, and different unique numbers constituted by natural numbers of p or less are allocated to the p hash functions, respectively, which are previously shared with the user authentication server, in which the user authentication server stores an authentication code previously issued for each user and a public key corresponding to a private key previously issued for each user, as authentication information for the plurality of users on the user database; generating an authentication event for confirming whether the user of the electronic apparatus is the registered user who may use the UI design application service which matches the place and the time zone when the application is driven in the electronic apparatus; randomly selecting, when the authentication event is generated, a first hash function which is any one of the p hash functions, and then applying the first authentication code into the first hash function as an input to create a first hash value; confirming a first unique number allocated to the first hash function, creating a first electronic signature value by electronically signing the first unique number with a first private key previously issued for the user of the electronic apparatus, and then transmitting a confirmation request instruction for requesting confirmation whether the user of the electronic apparatus is the registered user who may use the UI design application service which matches the place and the time zone while transmitting the first electronic signature value and the first hash value to the user authentication server; and displaying the query message on the screen as the user authentication server extracts the first authentication code and the first public key for the user of the electronic apparatus, which are stored in the user database, decrypts the first electronic signature value with the first public key to restore the first unique number, and then compares the hash value created by applying the first authentication code into the first hash function to which the first unique number is allocated among the p hash functions as the input with the first hash value, and as it is confirmed that both hash values coincide with each other, when a response indicating that it is confirmed that the user of the electronic apparatus is the registered user who may use the UI design application service which matches the place and the time zone is received from the user authentication server, in response to the confirmation request instruction.

Hereinabove, the operating method of the electronic apparatus according to an exemplary embodiment of the present invention is described with reference to FIG. 2. Here, since the operating method of the electronic apparatus according to an exemplary embodiment of the present invention may correspond to the configuration of the operation of the electronic apparatus 110 described by using FIG. 1, a more detailed description thereof will be omitted.

The operating method of the electronic apparatus according to an exemplary embodiment of the present invention may be implemented by a computer program stored in a storage medium for executing the computer program through coupling with a computer.

The operating method of the electronic apparatus according to an exemplary embodiment of the present invention may be implemented in a program instruction type which may be performed through various computer means and recorded in a computer readable medium. The computer readable medium may include a program command, a data file, a data structure, etc., singly or combinationally. The program command recorded in the medium may be specially designed and configured for the present invention, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all things which are equivalent to the claims or equivalently modified to the claims are included in the scope of the spirit of the present invention.

What is claimed is:

1. An electronic apparatus capable of applying the design of a UI component based on the device's usage environment, comprising:
   a table storage unit storing a first table in which a place code corresponding to each of predetermined n, wherein n is a natural number of 2 or more, types of places is recorded and a second table in which a time zone code corresponding to each of predetermined k, wherein k is a natural number of 2 or more, time zones is recorded;
   a template storage unit storing a template set for each of a plurality of predetermined UI components, in which the template set for each of the plurality of UI components means a set constituted by a plurality of design templates pre-made for expressing each UI component, and a place code and a time zone code pre-specified to match each design template from the n types of places and the k time zones, respectively are allocated to the plurality of design templates included in the template set for each of the plurality of UI components;
   a query unit displaying, when an application constituted by the plurality of UI components is driven in the electronic apparatus, a query message for querying whether to apply UI designs of the plurality of UI components constituting the application as a design which matches the place and the time zone on a screen;
   a confirmation unit collecting, when a positive response for the query message is received from the user of the electronic apparatus, current positional information of the electronic apparatus, and confirming at which place among the n types of places the electronic apparatus is positioned by referring to prestored map data, and at the same time, confirming in which time zone among the k time zones a time zone of a current time point is;
   a code confirming unit confirming, when a first place is confirmed as a place at which the electronic apparatus is positioned and the time zone of the current time point is confirmed as a first time zone, a first place code corresponding to the first place by referring to the first table and confirming a first time zone code corresponding to the first time zone by referring to the second table; and
   a UI configuration unit matching a design template to which the first place code and the first time zone code are allocated among a plurality of design templates included in the template set corresponding to each UI component by referring to the template storage unit with respect to each of the plurality of UI components constituting the application, and then applying the UI design of each of the plurality of UI components constituting the application as the design template which matches each UI component.

2. The electronic apparatus of claim 1, further comprising:
   a basic template storage unit storing a predetermined basic design template for each of the plurality of UI components; and
   a basic UI configuration unit applying, when receiving the negative response for the query message from the user of the electronic apparatus, the UI designs of the plurality of respective UI components constituting the application as the basic design template for each UI component by referring to the basic template storage unit.

3. The electronic apparatus of claim 1, further comprising:
   a judgment unit confirming positional information of the electronic apparatus and the time zone of the current time point at a predetermined confirmation cycle interval when the UI design of each of the plurality of UI components constituting the application has been applied as the design template which matches each UI component through the UI configuration unit to judge whether a fluctuation for the first place and a fluctuation for the first time zone occur;
   an update query unit displaying, when it is judged that the fluctuation for the first place occurs and the fluctuation for the first time zone occurs, on the screen, an update query message for querying whether to update the UI designs of the plurality of UI components constituting the application with a design which matches the fluctuating place or time zone; and
   a UI update unit confirming, when an UI update instruction is received from the user of the electronic apparatus in response to the update query message, the place code for the fluctuating place or the time zone code for the fluctuating time zone by referring to the first table and the second table, matches the design template to which the place code for the fluctuating place or the time zone code for the fluctuating time zone are allocated among the plurality of design templates included in the template set corresponding to each UI component by referring to the template storage unit with respect to each of the plurality of UI components constituting the application, and then applying the UI design of each of the plurality of UI components constituting the application as the design template which matches each UI component again.

4. The electronic apparatus of claim 1, wherein the query unit confirming whether the user of the electronic apparatus is a registered user who may use a UI design application service which matches the place and the time zone, and then displaying, on the screen, the query message when it is confirmed that the user of the electronic apparatus is the registered user who may use the UI design application service which matches the place and the time zone by interlocking with a predetermined user authentication server, in which the user authentication server includes a user database storing authentication information of a plurality of users, which is pre-specified that the user is the registered user who may use the UI design application service which matches the place and the time zone when the application is driven in the electronic apparatus.

5. The electronic apparatus of claim 4, wherein the query unit includes
   a hash function storage unit storing a first authentication code for the user of the electronic apparatus, and p, wherein p is a natural number, different hash functions, in which the p hash functions are also stored in the user authentication server, and different unique numbers constituted by natural numbers of p or less are allocated to the p hash functions, respectively, which are previously shared with the user authentication server, in which the user authentication server stores an authentication code previously issued for each user and a public key corresponding to a private key previously issued for each user, as authentication information for the plurality of users on the user database;

an authentication event generation unit generating an authentication event for confirming whether the user of the electronic apparatus is the registered user who may use the UI design application service which matches the place and the time zone when the application is driven in the electronic apparatus;

a hash value creation unit randomly selecting, when the authentication event is generated, a first hash function which is any one of the p hash functions, and then applying the first authentication code into the first hash function as an input to create a first hash value;

a confirmation request unit confirming a first unique number allocated to the first hash function, creating a first electronic signature value by electronically signing the first unique number with a first private key previously issued for the user of the electronic apparatus, and then transmitting a confirmation request instruction for requesting confirmation whether the user of the electronic apparatus is the registered user who may use the UI design application service which matches the place and the time zone while transmitting the first electronic signature value and the first hash value to the user authentication server; and a display processing unit displaying the query message on the screen as the user authentication server extracts the first authentication code and the first public key for the user of the electronic apparatus, which are stored in the user database, decrypts the first electronic signature value with the first public key to restore the first unique number, and then compares the hash value created by applying the first authentication code into the first hash function to which the first unique number is allocated among the p hash functions as the input with the first hash value, and as it is confirmed that both hash values coincide with each other, when a response indicating that it is confirmed that the user of the electronic apparatus is the registered user who may use the UI design application service which matches the place and the time zone is received from the user authentication server, in response to the confirmation request instruction.

6. An operating method of an electronic apparatus capable of applying the design of a UI component based on the device's usage environment, comprising:

maintaining a table storage unit storing a first table in which a place code corresponding to each of predetermined n, wherein n is a natural number of 2 or more, types of places is recorded and a second table in which a time zone code corresponding to each of predetermined k, wherein k is a natural number of 2 or more, time zones is recorded;

maintaining a template storage unit storing a template set for each of a plurality of predetermined UI components, in which the template set for each of the plurality of UI components means a set constituted by a plurality of design templates pre-made for expressing each UI component, and a place code and a time zone code pre-specified to match each design template from the n types of places and the k time zones, respectively are allocated to the plurality of design templates included in the template set for each of the plurality of UI components;

displaying, when an application constituted by the plurality of UI components is driven in the electronic apparatus, a query message for querying whether to apply UI designs of the plurality of UI components constituting the application as a design which matches the place and the time zone on a screen;

collecting, when a positive response for the query message is received from the user of the electronic apparatus, current positional information of the electronic apparatus, and confirming at which place among the n types of places the electronic apparatus is positioned by referring to prestored map data, and at the same time, confirming in which time zone among the k time zones a time zone of a current time point is;

confirming, when a first place is confirmed as a place at which the electronic apparatus is positioned and the time zone of the current time point is confirmed as a first time zone, a first place code corresponding to the first place by referring to the first table and confirming a first time zone code corresponding to the first time zone by referring to the second table; and matching a design template to which the first place code and the first time zone code are allocated among a plurality of design templates included in the template set corresponding to each UI component by referring to the template storage unit with respect to each of the plurality of UI components constituting the application, and then applying the UI design of each of the plurality of UI components constituting the application as the design template which matches each UI component.

7. The operating method of an electronic apparatus of claim 6, further comprising:

maintaining a basic template storage unit storing a predetermined basic design template for each of the plurality of UI components; and applying, when receiving the negative response for the query message from the user of the electronic apparatus, the UI designs of the plurality of respective UI components constituting the application as the basic design template for each UI component by referring to the basic template storage unit.

8. The operating method of an electronic apparatus of claim 6, further comprising:

confirming positional information of the electronic apparatus and the time zone of the current time point at a predetermined confirmation cycle interval when the UI design of each of the plurality of UI components constituting the application has been applied as the design template which matches each UI component to judge whether a fluctuation for the first place and a fluctuation for the first time zone occur;

displaying, when it is judged that the fluctuation for the first place occurs and the fluctuation for the first time zone occurs, on the screen, an update query message for querying whether to update the UI designs of the plurality of UI components constituting the application with a design which matches the fluctuating place or time zone; and confirming, when an UI update instruction is received from the user of the electronic apparatus in response to the update query message, the place code for the fluctuating place or the time zone code for the fluctuating time zone by referring to the first table and the second table, matches the design template to which the place code for the fluctuating place or the time zone code for the fluctuating time zone are allocated among the plurality of design templates included in the template set corresponding to each UI component by referring to the template storage unit with respect to each of the plurality of UI components constituting the application, and then applying the UI design of each of the plurality of UI components constituting the application as the design template which matches each UI component again.

9. The operating method of an electronic apparatus of claim 6, wherein in the displaying of the query message on the screen,
it is confirmed whether the user of the electronic apparatus is a registered user who may use a UI design application service which matches the place and the time zone, and then the query message is displayed on the screen when it is confirmed that the user of the electronic apparatus is the registered user who may use the UI design application service which matches the place and the time zone by interlocking with a predetermined user authentication server, in which the user authentication server includes a user database storing authentication information of a plurality of users, which is pre-specified that the user is the registered user who may use the UI design application service which matches the place and the time zone when the application is driven in the electronic apparatus.

10. The operating method of an electronic apparatus of claim 9, wherein the displaying of the query message on the screen includes
maintaining a hash function storage unit maintaining a hash function storage unit storing a first authentication code for the user of the electronic apparatus, and p, wherein p is a natural number, different hash functions, in which the p hash functions are also stored in the user authentication server, and different unique numbers constituted by natural numbers of p or less are allocated to the p hash functions, respectively, which are previously shared with the user authentication server, in which the user authentication server stores an authentication code previously issued for each user and a public key corresponding to a private key previously issued for each user, as authentication information for the plurality of users on the user database;
generating an authentication event for confirming whether the user of the electronic apparatus is the registered user who may use the UI design application service which matches the place and the time zone when the application is driven in the electronic apparatus;
randomly selecting, when the authentication event is generated, a first hash function which is any one of the p hash functions, and then applying the first authentication code into the first hash function as an input to create a first hash value;
confirming a first unique number allocated to the first hash function, creating a first electronic signature value by electronically signing the first unique number with a first private key previously issued for the user of the electronic apparatus, and then transmitting a confirmation request instruction for requesting confirmation whether the user of the electronic apparatus is the registered user who may use the UI design application service which matches the place and the time zone while transmitting the first electronic signature value and the first hash value to the user authentication server; and
displaying the query message on the screen as the user authentication server extracts the first authentication code and the first public key for the user of the electronic apparatus, which are stored in the user database, decrypts the first electronic signature value with the first public key to restore the first unique number, and then compares the hash value created by applying the first authentication code into the first hash function to which the first unique number is allocated among the p hash functions as the input with the first hash value, and as it is confirmed that both hash values coincide with each other, when a response indicating that it is confirmed that the user of the electronic apparatus is the registered user who may use the UI design application service which matches the place and the time zone is received from the user authentication server, in response to the confirmation request instruction.

11. A non-transitory computer readable recording medium having a program recorded therein for allowing a computer to execute an operating method of an electronic apparatus capable of applying the design of a UI component based on the device's usage environment, comprising:
maintaining a table storage unit storing a first table in which a place code corresponding to each of predetermined n, wherein n is a natural number of 2 or more, types of places is recorded and a second table in which a time zone code corresponding to each of predetermined k, wherein k is a natural number of 2 or more, time zones is recorded;
maintaining a template storage unit storing a template set for each of a plurality of predetermined UI components, in which the template set for each of the plurality of UI components means a set constituted by a plurality of design templates pre-made for expressing each UI component, and a place code and a time zone code pre-specified to match each design template from the n types of places and the k time zones, respectively are allocated to the plurality of design templates included in the template set for each of the plurality of UI components;
displaying, when an application constituted by the plurality of UI components is driven in the electronic apparatus, a query message for querying whether to apply UI designs of the plurality of UI components constituting the application as a design which matches the place and the time zone on a screen;
collecting, when a positive response for the query message is received from the user of the electronic apparatus, current positional information of the electronic apparatus, and confirming at which place among the n types of places the electronic apparatus is positioned by referring to prestored map data, and at the same time, confirming in which time zone among the k time zones a time zone of a current time point is;
confirming, when a first place is confirmed as a place at which the electronic apparatus is positioned and the time zone of the current time point is confirmed as a first time zone, a first place code corresponding to the first place by referring to the first table and confirming a first time zone code corresponding to the first time zone by referring to the second table; and
matching a design template to which the first place code and the first time zone code are allocated among a plurality of design templates included in the template set corresponding to each UI component by referring to the template storage unit with respect to each of the plurality of UI components constituting the application, and then applying the UI design of each of the plurality of UI components constituting the application as the design template which matches each UI component.

* * * * *